United States Patent [19]

Ozaki et al.

[11] 4,234,385
[45] Nov. 18, 1980

[54] NUCLEAR FUEL ELEMENT

[75] Inventors: Satoru Ozaki, Ichikawa; Yoshiharu Ochi, Yokohama; Kazuo Matsumura, Kawasaki, all of Japan

[73] Assignee: Tokyo Shibaura Electric Co., Ltd., Kawasaki, Japan

[21] Appl. No.: 898,373

[22] Filed: Apr. 20, 1978

[30] Foreign Application Priority Data

Apr. 22, 1977 [JP] Japan .................................. 52/45805

[51] Int. Cl.² .............................................. G21C 3/58
[52] U.S. Cl. .................................... 176/68; 75/128 T; 428/684; 176/78
[58] Field of Search .................. 176/68, 76, 78, 91 R; 75/128 T; 428/684

[56] References Cited

U.S. PATENT DOCUMENTS

| | | | |
|---|---|---|---|
| 3,119,687 | 1/1964 | Kirschning | 176/91 R X |
| 3,440,037 | 4/1969 | Martin et al. | 75/128 T X |
| 3,563,728 | 2/1971 | Allio et al. | 176/91 R X |
| 3,925,109 | 12/1975 | Nilsen | 176/78 X |
| 3,940,267 | 2/1976 | Mimino et al. | 75/128 T X |
| 3,985,514 | 10/1976 | Miller | 428/684 X |
| 3,989,514 | 11/1976 | Fujioka et al. | 75/128 T X |
| 4,011,133 | 3/1977 | Bloom et al. | 75/128 T X |
| 4,049,431 | 9/1977 | Hagel et al. | 176/91 R X |
| 4,099,966 | 7/1978 | Chivinsky | 75/128 T X |
| 4,108,641 | 8/1978 | Fujioka et al. | 75/128 T X |

*Primary Examiner*—Peter A. Nelson
*Attorney, Agent, or Firm*—Oblon, Fisher, Spivak, McClelland & Maier

[57] ABSTRACT

A nuclear fuel element comprising a fuel body formed of nuclear fuel material and a clad for covering the fuel body. The clad is formed of an austenitic stainless steel containing silicon, titanium and carbon, respectively, in a controlled quantity.

8 Claims, 4 Drawing Figures

FIG. 2
FIG. 3
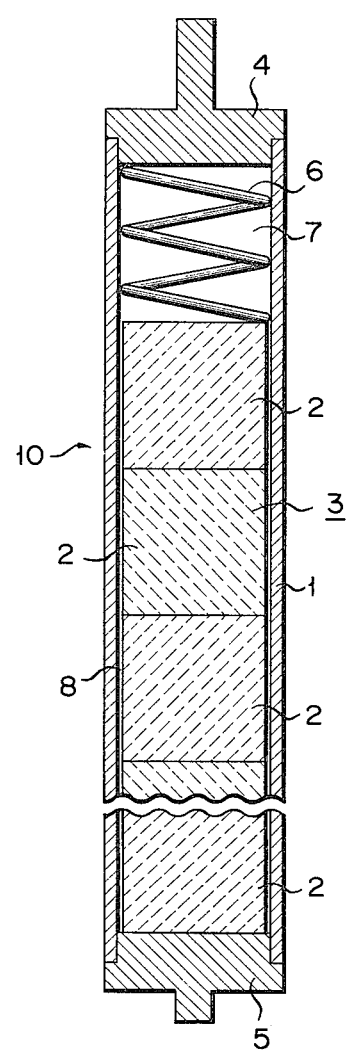
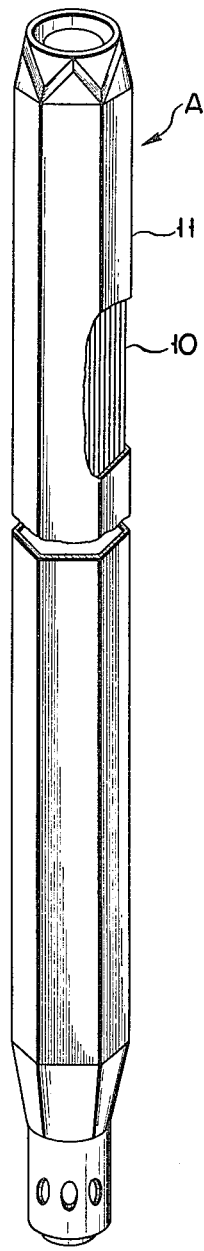

F I G. 4
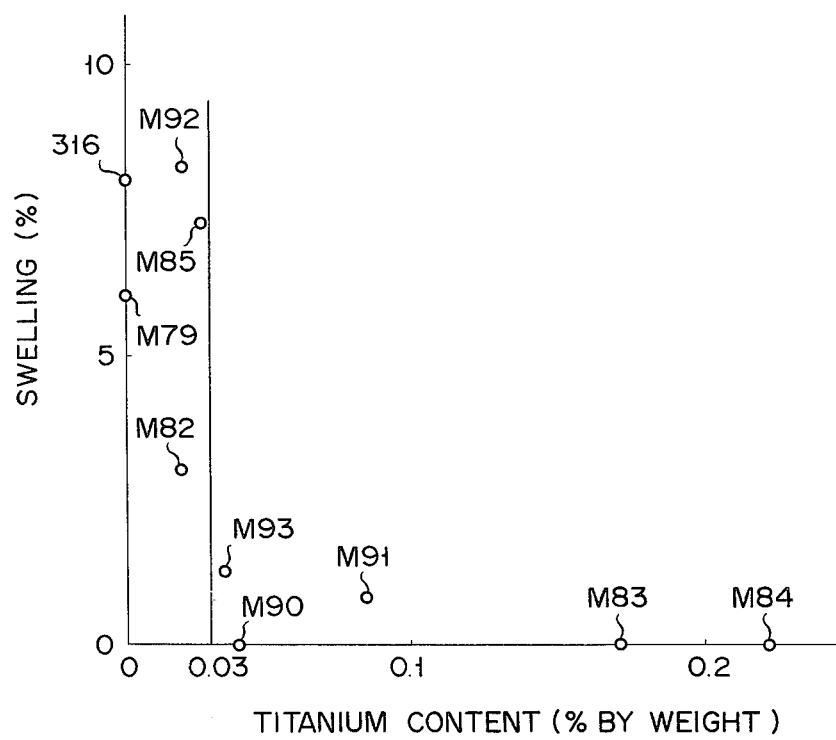

NUCLEAR FUEL ELEMENT

BACKGROUND OF THE INVENTION

I. Field of the Invention

This invention relates to a nuclear fuel element and a fuel subassembly, and more particularly, to a nuclear fuel element and a fuel subassembly suitable for use in a first breeder reactor.

II. Description of the Prior Art

Generally, a fuel body is provided with a clad so as to be prevented from a reaction with a coolant, or to prevent fission products from leaking outside. As a cladding material suitable for such a purpose, an austenitic stainless steel is exclusively used. However, irradiation of high-speed neutrons at a high temperature gives rise to a so-called swelling in austenitic stainless steel as well as in other members constituting the reactor core. The swelling is greatly attributed to the void production in metal, and therefore, an attempt to reduce the swelling by minimizing production of voids has been made at the austenitic stainless steel.

For example, an austenitic stainless steel is subjected to cold working and is increased in advance in the dislocation density in order to reduce the swelling. When, however, the stainless steel which has been cold worked is exposed to a high temperature, particularly, to temperatures of more than 700° C., the dislocation density of the steel is reduced by being annealed within a relatively short period of time.

Though addition of silicon in an amount of 1.1 to 2.0% by weight to SUS 316 steel is known, the addition of such a large amount of silicon exerts a bad influence on the physical and mechanical properties of the steel. Further, the silicon also strongly acts on steel to make it into ferrite, so that austenite-forming elements such as sulphur, manganese, and nitrogen are required to be added to the steel together with silicon for the purpose of stabilizing the austenite system. Nevertheless, all these additive elements are injurious to stainless steel. For example, sulphur brings about the red shortness to and decreases the hot workability of the steel, manganese lowers the corrosion resistance, and nitrogen worsens the neutron economy and is turned into herium by a nuclear reaction to cause stainless steel to be embrittled at a high temperature.

Further, in Japanese patent application Disclosure (kokai) No. 52-130975 (laid open to the public inspection on Feb. 1, 1977), reference is made to the austenitic stainless steel containing 0.7 to 2% by weight of silicon and 0.1 to 0.5% by weight of titanium. As already mentioned above, the large amount of silicon contained in steel, particularly, the amount exceeding 1% by weight, may eventually damage the physical and mechanical properties of steel, and therefore, this is not preferable.

In the fast breeder reactor under design or construction at present, the void swelling of the stainless steel of JIS 300 series (approximately corresponding to the steel of AISI 300 series) which is used as the cladding material for the nuclear fuel is required not to exceed several percentages, for example, 6%, during the period of operation of the reactor. On the other hand, under the expected conditions of working of a liquid metal cooled fast breeder reactor (LMFBR), the void swelling of steel is considered to surely exceed 10% at the end of the prearranged period of operation, and the economical loss resulting from that is taken to be immense. Accordingly, there is a strong demand for development of the cladding material with a lower void swelling.

SUMMARY OF THE INVENTION

Accordingly, an object of this invention is to provide a nuclear fuel element using a cladding material which has little swelling and excellent physical and mechanical properties.

According to the present invention there is provided a nuclear fuel element comprising a fuel body formed of nuclear fuel material and a clad for covering the fuel body, the clad being formed of an austenitic stainless steel consisting essentially of nickel in a predetermined amount, chromium in a predetermined amount, silicon in an amount of more than 0 to less than 0.7% by weight, carbon and titanium in amounts satisfying the relationship:

$$17[C]+27[Ti]\geq 2.1$$

where [C] represents the carbon content in % by weight and [Ti] the titanium content in % by weight, with the upper limit of the carbon content being 0.1% by weight and the upper limit of the titanium content being 0.5% by weight, and the balance of iron.

A nuclear fuel subassembly comprising a plurality of such fuel elements arranged in a duct in parallel is also within the scope of the present invention.

BRIEF DESCRIPTION OF THE DRAWING

FIG. 2 is a longitudinal sectional view showing the fuel element;

FIG. 3 is a side elevational view, partially cutaway, of a fuel subassembly; and FIG. 4 is a graph showing a relationship between the titanium content in the austenitic stainless steel and the degree of swelling.

DESCRIPTION OF THE PREFERRED EMBODIMENTS

Figure 1:
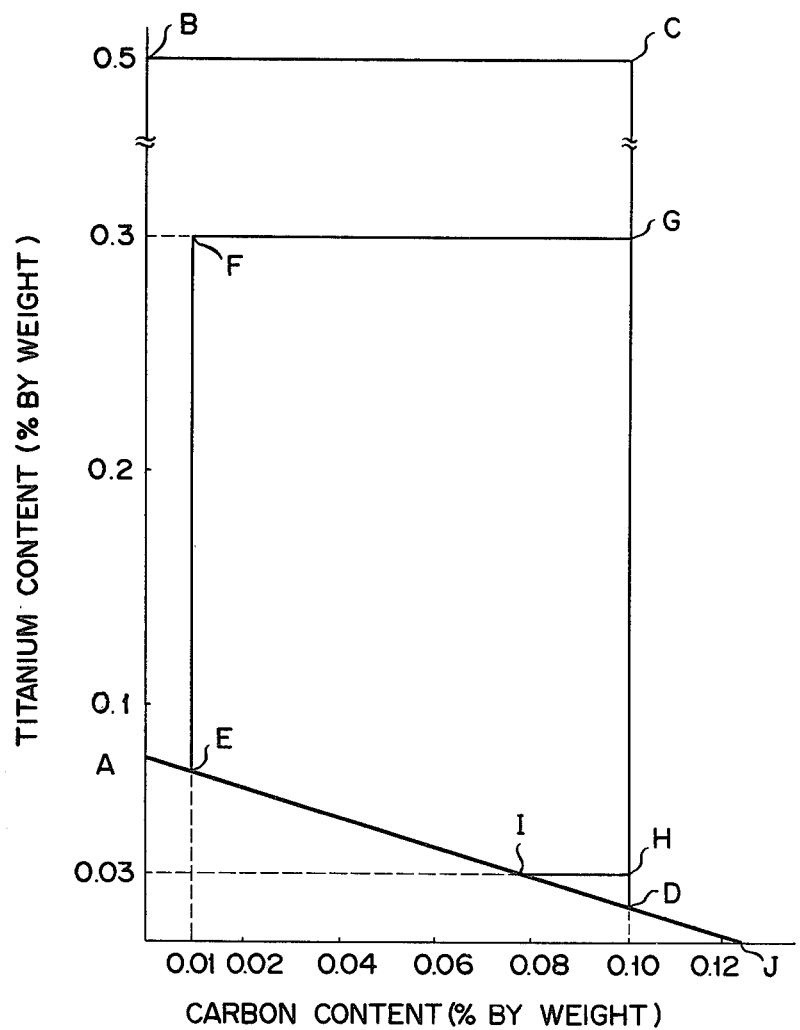
FIG. 1 is a graph showing the range of percentages of carbon and titanium contained in the austenitic stainless steel which forms a clad for the fuel element according to this invention.

The present invention is based on the discovery, as a result of numerous experiments, that if silicon, titanium and carbon as essential components are added to the austenitic stainless steel, the silicon content is made under 0.7% by weight, and further, the contents of titanium and carbon are controlled so as to satisfy a certain relationship, the swelling of steel would be suppressed to the extremely low order (for example, 1.5% at maximum at $1\times 10^{23}$ nvt irradiation), without damaging the physical and mechanical properties of steel. It is found according to the invention that there exist complementary relations in the contents of silicon, titanium and carbon in the suppression of the swelling, though the mechanism of suppressing the swelling is not known in detail.

The term "austenitic stainless steel" as used in this specification and the appended claims means an austenitic stainless steel containing chromium in a normally prescribed amount, nickel in a normally prescribed amount, manganese in an amount of up to 2% by weight, molybdenum in an amount of up to 3% by weight, silicon, carbon and titanium in amounts as hereinafter described, and the balance of iron. In addition the steel may contain incidental components which may be incorporated from the ordinary process of manufacturing steel. Such incidental components include nitrogen of up to 3%, oxygen of up to 0.02%, aluminium of up to 0.05%, arsenic of up to 0.03%, boron of up to 0.002%, cobalt of up to 0.1%, niobium of up to 0.05%, copper of up to 0.1%, sulphur of up to 0.03%, and vanadium of up to 0.2%.

In general, the chromium content of the steel is in the range of 9 to 26% by weight. If the content is more than 26 wt.%, neither the stable austenitic system can be obtained, nor the void suppression may be attained. On the contrary, if the content is below 9 wt.%, a sufficient oxidation resistance cannot be obtained. Preferably, the content of chromium is 16 to 20% by weight.

Usually, the nickel content of the steel is 6 to 30% by weight. Although the nickel content of more than 30% by weight is effective in the suppression of the swelling, a steel containing such an amount of nickel decreases in the corrosion resistance to a liquid metal, and is readily attacked by the nuclear fission products. Moreover, it not only aggravates neutron economy, but also causes a large amount of cobalt as an impurity to be contained in nickel. As a result, cobalt 60 originated from the cobalt may be turned into the most cumbersome radioactive corrosion product and interfere with the operation of the nuclear reactor. Whereas, with the nickel content of less than 6 wt.%, there can be obtained no stable austenite system, and the effect of suppressing the void would be lost. A preferable content of nickel is in the range of 10 to 16% by weight.

While the silicon added to the austenitic stainless steel according to this invention is a component essential for suppressing the void swelling, addition of a large amount of silicon may destroy the physical and mechanical properties of the steel. Accordingly, the silicon content is preferable to be kept at a low level, if the contents of carbon and titanium to be added together with the silicon satisfy the relationship as described hereinafter. Generally, the silicon content is kept below 0.7% by weight (i.e., more than 0% to less than 0.7% by weight), preferably 0.5% to less than 0.7% by weight.

It has been found, as a result of the various experiments, that there exists a correlation between the titanium content and the carbon content in suppressing the void swelling, and that if carbon and titanium in amounts satisfying the following relationship are added to the austenitic stainless steel which contains the silicon kept within the abovementioned quantitative limits, the void swelling can be suppressed to a very small extent (i.e., 1.5% at maximum at $1 \times 10^{23}$ nvt irradiation). The relationship between the contents of carbon and titanium will be given by the following formula.

$$17[C] + 27[Ti] \geq 2.1 \qquad (A)$$

where [C] represents the carbon content indicated in % by weight and exceeding 0, and [Ti] represents the titanium content indicated in % by weight and exceeding 0.

The upper limits of the carbon content and the titanium content can not be determined unconditionally, and increasing both the carbon and titanium contents causes the mechanical properties of steel to be aggravated, for example, embrittled. The upper limits with respect to the carbon content and the titanium content capable of sufficiently suppressing the void swelling without substantially aggravating the mechaical properties of the steel are 0.1% by weight and 0.5% by weight, respectively.

Preferably, the minimum carbon content is 0.01% by weight, and a preferred range based on this minimum is 0.01 to 0.1% by weight. Further, the minimum titanium content is preferably 0.03% by weight, and a preferred range based on this minimum is 0.03% to 0.3% by weight.

The variables [C] and [Ti] in the formula (A) are interdependent, and if either of the variables is fixed, then the other one varies between the above-mentioned maximum value and the minimum value calculated from the formula (A) with the formula (A) taken as an equation. That is, for example, where [C] is 0.02, [Ti] varies between the maximum value of 0.5 and the minimum value of about 0.065 calculated with the formula (A) taken as an equation. This applies also to the preferable cases of the carbon content and the titanium content as stated above. Namely, if [C] is 0.02, then [Ti] is preferably in the range of 0.065 to 0.3 (% by weight).

FIG. 1 shows the relationship between the carbon content and the titanium content by a graph. In the figure, line AJ stands for the formula: $17[C] + 27[Ti] = 2.1$. A general range of the carbon and titanium contents fall within the region encircled by lines AB, BC, CD and DA, and the region encircled by lines EF, FG, GH, HI and IE shows a preferable range of carbon and titanium contents.

Further, it has been found according to the invention that the void swelling can be further suppressed and the mechanical properties of steel is improved by subjecting the austenitic stainless steel to a final heat treatment at a temperature enough to permit the carbon and titanium contained in the steel to be formed substantially completely into a solid-solution. The final heat treatment is such a treatment as to be effected at the end of the process to provide the product and is generally carried out at a temperature of more than 1120° C. up to 1200° C. A heat treatment at a temperature of 1120° C. or less can not form the solid-solution satisfactorily, while a heat treatment at a temperature of more than 1200° C. can not attain the necessary mechanical strength of the steel and is uneconomical. The final heat treatment is preferably carried out at a temperature of 1150° C. to 1200° C. and for one to ten minutes.

FIG. 2 shows a nuclear fuel element 10. A solid fuel body 3 composed of a plurality of pellets 2 is housed in a cylindrical clad 1 which is formed of the austenitic stainless steel according to this invention. The pellets 2 may be obtained by compression-moulding a nuclear fuel material such as the oxides, nitrides and carbides of uranium, plutonium and thorium, or a mixture thereof into a cylindrical shape and sintering it at a high temperature. The clad 1 is sealed tight by means of plugs 4 and 5 provided at the both ends thereof and a spring 6 for preventing the pellets 2 from the movement is installed in a plenum chamber 7 located between the fuel body 3 and the plug 4. A gap 8 is present between the clad 1 and the fuel body 3. In the plenum chamber 7 and the gap 8 is filled herium gas.

FIG. 3 shows a nuclear fuel subassembly A. A plurality of the nuclear fuel elements 10 as shown in FIG. 2 are supported by grids (not shown) and received in a duct 11, with any adjoining two of the elements separated from each other by a spacer (not shown). It is preferred that the duct 11 be formed of the austenitic stainless steel according to this invention.

This invention will be more fully understood from the following examples.

Examples.

Sample steels, each 750 g, were prepared by melting a steel component of high purity in a vacuum. The steel was cast into a rod of approximately 3.5 cm in diameter and then made up to a plate of approximately 3 mm thick by hot-rolling at 1150° C. Then, the steel plate was rapidly cooled after annealed at 1150° C. for 10 minutes, and cold-rolled into a thin plate of approximately 0.5 mm thick. Thereafter, it was heat-treated at 1200° C. for 5 minutes.

A small test piece (8 mm×14 mm×0.2 mm thick) was cut out of the thin steel plate and then finished up with an electrolytic polishing after smoothing the surface thereof with an abrasive paper. Voids formed in the test piece by irradiation of carbon ions at high temperature was observed under an electron microscope, and the whole volume of the voids was determined, thereby estimating the amount of the swelling of steel. The evaluation of the quantity of the swelling was made by using the experimental correction (reported in Journal of Nuclear Science and Technology, Vol. 13, pp. 743-751) by SHIMADA et al.

In the simulative experiment by irradiation of the carbon ions, the temperature at which the swelling reaches the peak shifts higher by approximately 100° C., because the damaging speed of a sample is fast as much as 1000 times that by irradiation of neutrons. Accordingly, irradiation of the carbon ions at about 525° C. corresponds to irradiation of the neutrons at about 625° C. Meanwhile, pre-injection of herium into the test piece had been carried out so that herium ions injected in the test piece distirbuted uniformly over the surface to the depth of 4000 Å by changing the intensity of the herium ion energy.

Table 1 shows the components of the 316 steel which is an austenitic steel on market and various steels used for the above-mentioned experiments.

TABLE 1

| Sample steel No. | Ni | Cr | Mo | Mn | Si | C | Ti | S | P | Co | N | O |
|---|---|---|---|---|---|---|---|---|---|---|---|---|
| 316 | 10.5 | 17.5 | 2.63 | 0.78 | 0.44 | 0.050 | <0.01 | 0.005 | 0.03 | 0.24 | — | — |
| M79 | 14.1 | 17.5 | 2.48 | 0.91 | 1.05 | 0.068 | <0.01 | 0.005 | 0.025 | 0.041 | 0.0048 | 0.0136 |
| M82 | 13.5 | 17.4 | 2.52 | 1.67 | 0.59 | 0.041 | 0.02 | 0.006 | 0.002 | 0.042 | 0.0058 | 0.0088 |
| M83 | 13.3 | 16.8 | 2.46 | 1.69 | 0.58 | 0.018 | 0.17 | 0.006 | — | — | 0.0049 | 0.0070 |
| M84 | 13.8 | 16.9 | 2.44 | 1.77 | 0.52 | 0.101 | 0.22 | 0.007 | — | — | 0.0048 | 0.0079 |
| M85 | 13.2 | 16.7 | 2.44 | 1.65 | 0.48 | 0.072 | 0.025 | 0.006 | 0.001 | 0.043 | 0.0049 | 0.0066 |
| M90 | 13.3 | 16.6 | 2.47 | 1.59 | 0.55 | 0.087 | 0.039 | 0.007 | — | 0.041 | 0.0062 | 0.0068 |
| M91 | 13.1 | 16.7 | 2.47 | 1.65 | 0.51 | 0.055 | 0.084 | 0.007 | — | — | 0.0038 | 0.0050 |
| M92 | 13.0 | 16.7 | 2.46 | 1.67 | 0.59 | 0.022 | 0.019 | 0.007 | — | — | 0.0044 | 0.0058 |
| M93 | 13.3 | 16.7 | 2.47 | 1.63 | 0.63 | 0.016 | 0.034 | 0.007 | 0.002 | 0.042 | 0.0043 | 0.0072 |

Note: Unit % by weight; Fe balance

The results are shown in FIG. 4 which shows the amount of the swelling of each steel obtained by the irradiation of ions corresponding to that of high-speed neutrons at $1\times 10^{23}$ nvt under an expected condition of LMFBR, dotted against the titanium content. As seen from the figure, the sample steels can be classified into two groups with the titanium content at 0.03% as a border. That is, a first group is the high-swelling group composed of the steels 316, M79, M82, M85 and M92 with Ti content of less than 0.03%, and a second group is the low- and the extremely low-swelling group composed of the steels M83, M84, M90, M91 and M93 with Ti content of 0.03% or more. The high-swelling group shows a swelling of the order of 8% as represented by the 316 steel on the market, while the low- and the extremely low-swelling group shows an excellent resistivity to the swelling (i.e., the swelling of about 1% to less than 0.1%). The second group can completely satisfy the desired value of the swelling such as several percentages, for example, 6%, which is the swelling limit of the steel covering the nuclear fuel in the fast breeder reactor under design or construction at present. The reason is that since the amount of the high-speed neutrons at the end of the operation of the reactor is about $2\times 10^{23}$ nvt under the expected operation condition of the LMFBR and at such an amount of the neutrons the amount of swelling is proportional to the square of the amount of the neutrons with respect to 300 series stainless steel, the amount of swelling of 1% at the amount of the neutrons of $1\times 10^{23}$ nvt corresponds to the amount of swelling of 4% at the amount of the neutrons of $2\times 10^{23}$ nvt. Further, FIG. 4 clearly shows that the amount of swelling varies to a large extent between titanium contents of 0.02% and 0.03%.

What we claim is:

1. A nuclear fuel element comprising a fuel body formed of nuclear fuel material and a clad covering the fuel body, the clad being formed of an austenitic stainless steel consisting essentially of nickel, chromium, silicon in an amount of more than 0 to less than 0.7% by weight, carbon and titanium in amounts satisfying the relationship:

$$17[C]+27[Ti]\geq 2.1$$

where [C] represents the carbon content in % by weight and [Ti] the titanium content in % by weight, with the carbon content falling within the range 0.01 to 0.1% by weight and the titanium content falling within the range 0.03 to 0.5% by weight, and the balance of iron, wherein said austenitic stainless steel is subjected to a final heat treatment at a temperature enough to permit the carbon and titanium to be formed substantially completely into a solid solution.

2. A nuclear fuel element as defined in claim 1, wherein the upper limit of the titanium content is 0.3% by weight.

3. A nuclear fuel element as defined in claim 1, wherein said austenitic stainless steel contains silicon in an amount of 0.5% by weight or more.

4. A nuclear fuel element as defined in claim 1, wherein said austenitic stainless steel contains 6 to 26% by weight of nickel and 9 to 26% by weight of chromium.

5. A nuclear fuel element as defined in claim 1, wherein the final heat-treatment is carried out at a temperature of more than 1120° C. up to 1200° C.

6. A nuclear fuel element as defined in claim 1, wherein the nuclear fuel material is selected from the group consisting of the oxides, the nitrides and the carbides of uranium, plutonium and thorium, and a mixture thereof.

7. A nuclear fuel element comprising:
  a fuel body formed of a nuclear fuel material selected from the group consisting of the oxides, nitrides and carbides of uranium, plutonium and thorium, and a mixture thereof;
  a clad covering the fuel body, the clad being formed of an austenitic stainless steel consisting essentially of 6 to 26% by weight of nickel, 9 to 26% by weight of chromium, 0.5 to less than 0.7% by weight of silicon, carbon and titanium in amounts satisfying the relationship:

$$17[C] + 27[Ti] \geq 2.1$$

where [C] represents the carbon content in % by weight and [Ti] the titanium content in % by weight, with the carbon content falling within the range of 0.01 to 0.1% by weight and the titanium content falling within the range of 0.03 to 0.3% by weight, and the balance of iron, said austenitic stainless steel having been subjected to a final heat treatment at a temperature of more than 1120° C. up to 1200° C.

8. A nuclear fuel subassembly comprising a plurality of nuclear fuel elements according to claim 7.

* * * * *